United States Patent
Champney et al.

(10) Patent No.: US 6,176,662 B1
(45) Date of Patent: *Jan. 23, 2001

(54) STUD HAVING ANNULAR RINGS

(75) Inventors: Clark B. Champney, Vermilion; William C. Easterday, Elyria, both of OH (US)

(73) Assignee: Nelson Stud Welding, Inc., Elyria, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/271,661

(22) Filed: Mar. 17, 1999

(51) Int. Cl.[7] ........................................ F16B 37/06
(52) U.S. Cl. .................. 411/171; 411/389; 411/455; 52/506.05; 52/544; 52/549
(58) Field of Search ............................ 411/388, 389, 411/510, 455, 460, 480, 396, 171, 377, 372.5, 372.6, 373; 52/506.05, 544, 549

(56) References Cited

U.S. PATENT DOCUMENTS

| Re. 22,108 | | 6/1942 | Crecca . | |
|---|---|---|---|---|
| 1,830,460 | * | 11/1931 | Berge | 411/455 |
| 1,948,889 | * | 2/1934 | Simon | 411/455 |
| 2,421,184 | | 5/1947 | Candy . | |
| 2,451,190 | | 10/1948 | Anderson . | |
| 2,474,531 | | 6/1949 | Keir et al. . | |
| 4,429,209 | * | 1/1984 | Hinden | 411/171 |
| 4,528,783 | * | 7/1985 | Muir . | |
| 5,265,998 | * | 11/1993 | Kluser | 411/480 |
| 5,579,986 | * | 12/1996 | Sherry | 411/171 |
| 5,618,491 | | 4/1997 | Kurup et al. . | |
| 5,820,323 | * | 10/1998 | Barandun . | |
| 5,842,319 | * | 12/1998 | Ravetto | 411/460 |
| 5,947,669 | * | 9/1999 | Schaty . | |

OTHER PUBLICATIONS

An article entitled "N3P Navy Type Annular Ring," date unknown but prior to Oct. 1, 1998.

* cited by examiner

Primary Examiner—Flemming Saether
(74) Attorney, Agent, or Firm—Howard & Howard

(57) ABSTRACT

Improved welding stud (20) includes a generally cylindrical body (34). A first series of annular rings (42) are disposed on a first end portion (18) of the cylindrical body (34). A second series of annular rings (44) are disposed on a second end portion (26) of the cylindrical body (34). The rings (42, 44) are asymmetrical and have reverse configurations. Thus, the annular rings (42) on one end portion of the stud are a mirror image of the rings (44) on the opposite end portion of the stud. Either end of the stud (20) may be stud welded to a base member (14) using the drawn arm short cycle or gas arc stud welding processes. A cap (24) may then be press fitted onto the opposite end of the stud to secure insulation.

10 Claims, 2 Drawing Sheets

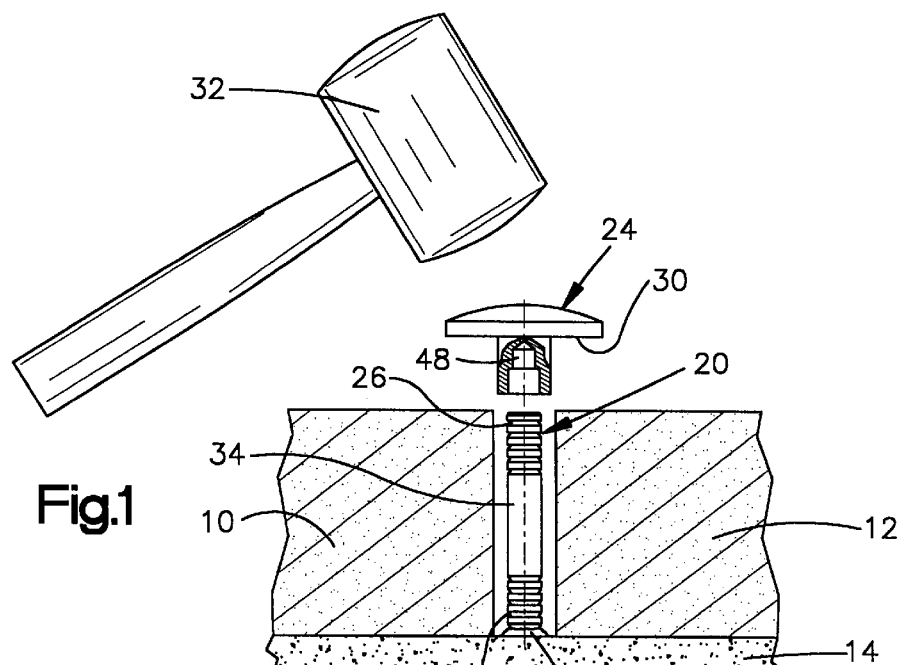
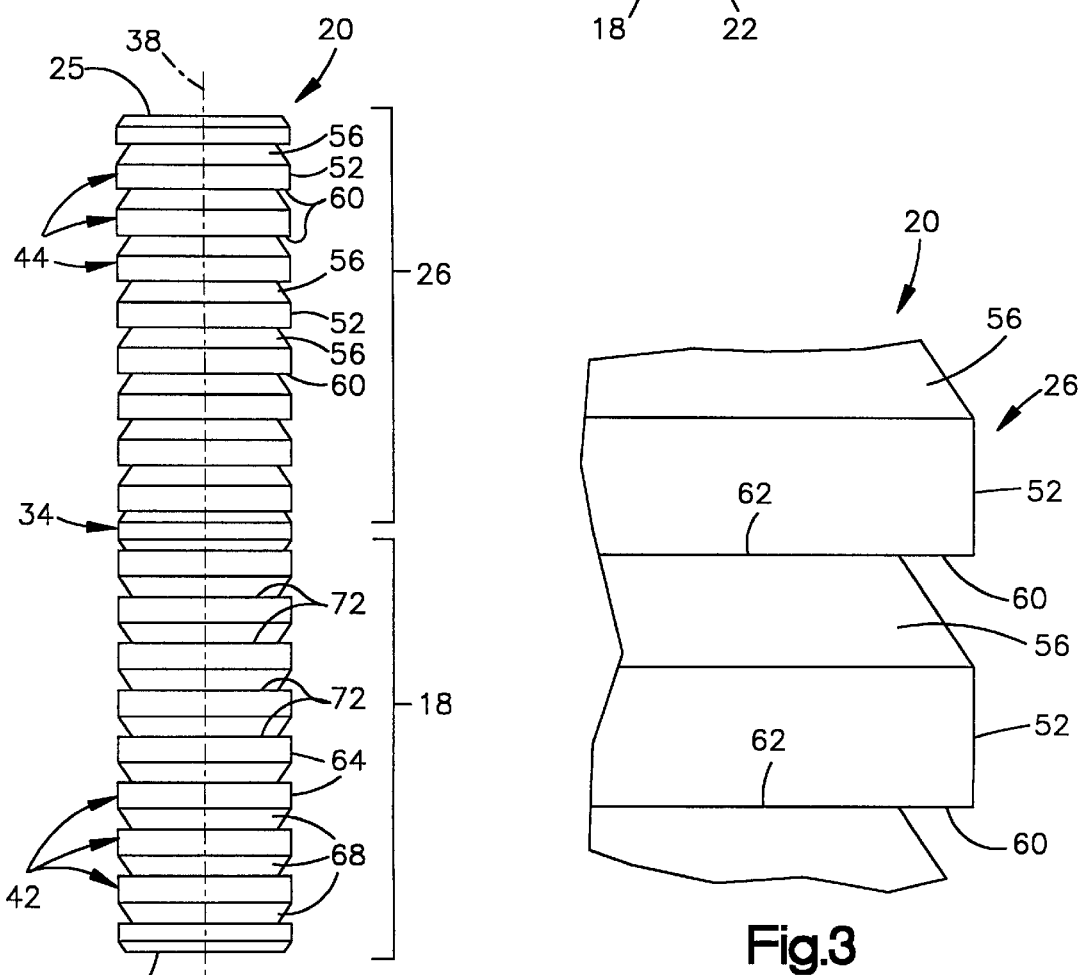
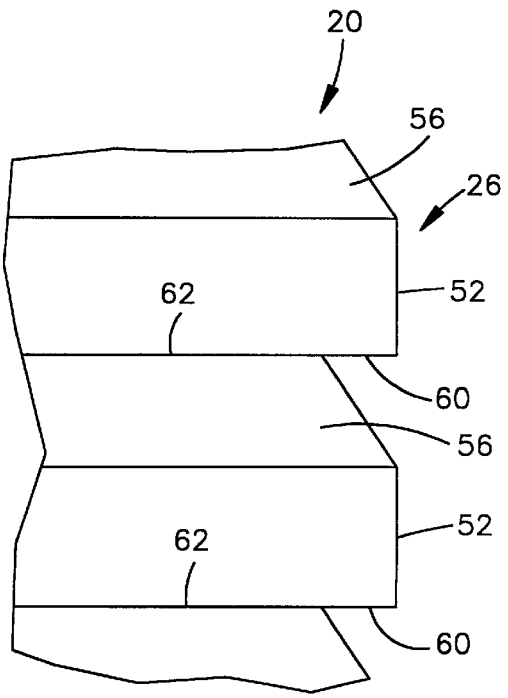

STUD HAVING ANNULAR RINGS

BACKGROUND OF THE INVENTION

The present invention relates to a weld stud for use with a press fitted cap and more specifically to a stud having one end portion which is welded to a base and a second end portion which is engaged by the cap.

A known apparatus for installing insulation on a metal ceiling or wall of a ship includes a stud. The known stud has a relatively large diameter base which is welded to the ceiling or wall of the ship. A generally cylindrical pin extends axially outward from the base and is engaged by a cap to hold the insulation in place. The pin has a smaller diameter than the base.

When this known stud is used to install insulation on a wall or ceiling of a ship, care must be taken to be certain that the base end of the stud is welded to the ceiling or wall of the ship. This means that the stud must be properly oriented when it is positioned in a stud welding gun or similar device. In addition, the large diameter base makes loading of the stud in a magazine of the stud welding gun for automatic feeding difficult since a stack of the studs in the magazine will tend to assume a curved configuration in a direction toward the relatively small diameter unwelded ends of the studs. Thus, the large diameter base ends of the studs will be disposed on the outside of the curve and the small diameter pin ends of the studs will be disposed in engagement with each other on the inside of the curve as shown in FIG. 5.

SUMMARY OF THE INVENTION

The present invention provides a new and improved welding stud for use with a press fitted cap. The welding stud includes a generally cylindrical body. A first series of annular rings is disposed on the first end portion of the cylindrical body of the stud. A second series of annular rings is disposed on the second end portion the cylindrical body. The second series of annular rings are a mirror image of the first series of annular rings to enable the cap to engage either the first or the second series of annular rings.

Both ends of a weld stud constructed in accordance with the present invention are identical. Therefore, either end of the weld stud can be welded. This eliminates the need to identify and orient the weld end when the studs of the present invention are loaded either automatically or manually into a stud welding gun.

BRIEF DESCRIPTION OF THE DRAWINGS

The foregoing and other features of the present invention will become more apparent upon consideration of the following description taken in connection with the accompanying drawings wherein:

FIG. 1 is a schematic pictorial sectional view illustrating the manner in which insulation is installed on a ship using a stud constructed in accordance with the present invention;

FIG. 2 is an enlarged elevational view of the stud of FIG. 1;

FIG. 3 is an enlarged fragmentary view of a portion of the stud of FIG. 2;

DESCRIPTION OF ONE SPECIFIC EMBODIMENT OF THE INVENTION

Figure 4:
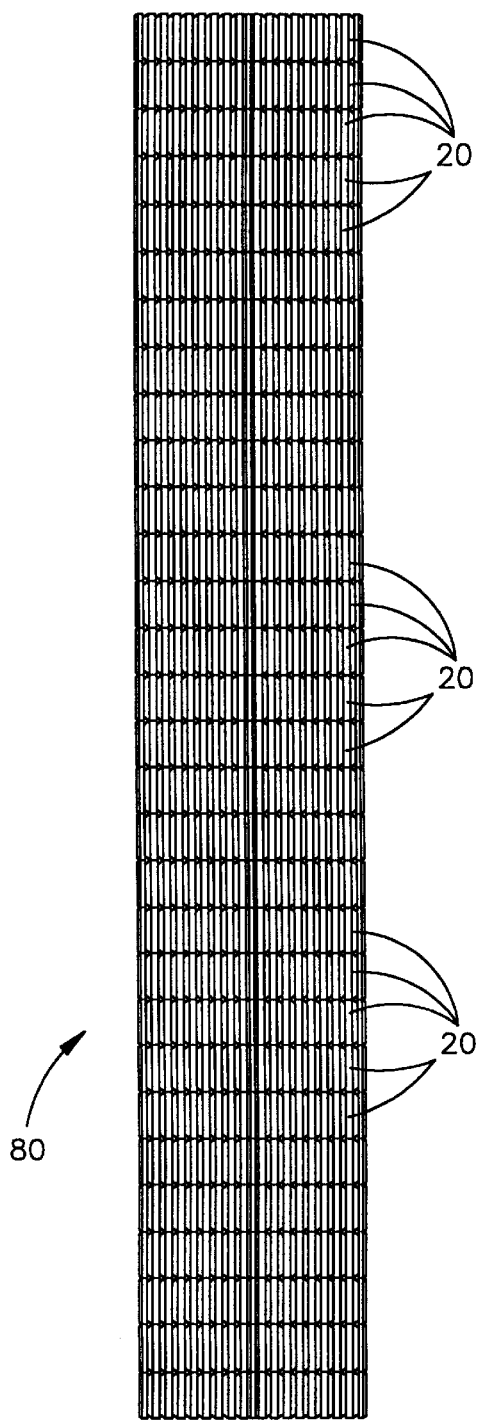
FIG. 4 illustrates an array of studs constructed in accordance with the present invention, as they would be disposed in a magazine of an automatic stud welding gun.

When panels 10 and 12 (FIG. 1) of insulation are to be installed on a metal wall 14 of a ship, an end surface 16 (FIG. 2) on a first or lower (as viewed in FIG. 1) end portion 18 of a stud 20 is stud welded to the metal wall 14. The stud 20 may be welded to the metal wall 14 using known short cycle or gas welding processes. The panels 10 and 12 of insulation are then impaled on the welded stud and positioned against the wall. A known cap 24 is then press fitted over an end surface 25 of the stud and hammered onto a second or upper end portion 26 of the stud 20.

The cap 24 (FIG. 1) has a flat annular inner side surface 30 which will contact and retain the panels 10 and 12 of insulation when the cap is fully installed. There is an interference fit between the stud 20 and cap 24. The cap 24 is normally driven onto the upper end portion 26 of the stud 20 by hitting the cap with a hammer 32. Of course, the cap 24 could be press fitted onto the upper end portion 26 of the stud 20 in a different manner if desired.

In accordance with a feature of the present invention, either the upper end portion 26 or the lower end portion 18 of the stud 20 can be welded to the wall 14. This is because the upper end portion 26 and lower end portion 18 of the stud 20 are mirror images of each other. This enables the stud 20 to be manually loaded into the chuck of a stud welding gun or to be positioned in the feed magazine of a stud welding gun with either the lower end portion 18 or upper end portion 26 of the stud leading. This speeds and simplifies either manual or automatic loading of the stud gun and eliminates errors during installation of the panels 10 and 12 of insulation.

In accordance with another feature of the present invention, the lower and upper end portions 18 and 26 of the stud 20 are the same size. The stud 20 has a generally cylindrical body 34. The stud 20 has the same maximum diameter throughout the length of the stud 20. This enables the studs 20 to be positioned in a feed magazine for a stud welding gun with longitudinal central axes 38 of the studs extending parallel to each other. If the lower and upper end portions 18 and 26 of the stud 20 had different diameters, the array of studs in the magazine would have a curved configuration which would present difficulties in designing the stud gun to handle different lengths of studs.

Since the stud 20 has a generally cylindrical body and has the same configuration at opposite ends 18 and 26 of the stud, manual loading of the stud into a stud welding gun is facilitated. This is because the stud 20 can be manually positioned in the stud welding gun with either the end 18 or the end 26 leading. The cylindrical configuration of the stud 20 facilitates handling of the stud.

The lower and upper end portions 18 and 26 of the body 34 of the stud 20 are provided with an upper and lower series of annular retaining rings 42 and 44 (FIG. 2). The lower series of retaining rings 42 are reversely arranged in comparison with the upper series of retaining rings 44. The annular retaining rings 42 and 44 have central axes which are coincident with the longitudinal central axis 38 of the stud 20.

The retaining rings 44 on the upper end portion 26 of the stud 20 cooperate with the cap 24 (FIG. 1) to hold the cap on the stud. The cap 24 has a cylindrical cavity 48 in which the upper end portion 26 of the stud 20 is telescopically received. The hammer 32 applies force against the cap to force the cap 24 axially downward onto the stud 20.

As the cap 24 is forced axially downward onto the stud 20, the retaining rings 44 (FIG. 2) on the upper end portion 26 of the stud 20 are forced into a portion of the cavity 48 (FIG. 1) having a diameter which is slightly smaller than the maximum diameter of the retaining rings 44. This results in an interference fit between the retaining rings 44 and the cap 24. The interference fit between the retaining rings 44 and the cap 24 securely holds the cap in place to retain the panels 10 and 12 of insulation against movement relative to the wall 14.

Although the stud 20 has been illustrated in FIG. 1 with the lower end portion 18 of the stud welded to the steel wall 14, the stud 20 could be oriented with the upper end portion 26 of the stud welded to the wall 14. If this was done, the retaining rings 42 on the lower end portion 18 of the stud 20 would engage the cap 24 and hold the cap in place against the panels 10 and 12 of insulation. The stud 20 can be oriented either with the end portion 18 or the end portion 26 upward (as viewed in FIG. 1) since the end portions 18 and 26 of the stud are mirror images of each other.

The retaining rings 44 on the stud 20 have identical configurations. Each of the retaining rings 44 includes a cylindrical outer side surface 52 (FIG. 3). The cylindrical outer side surfaces on the retaining rings 44 all have the same diameter. The cylindrical outer side surfaces 52 on the retaining rings 44 have central axis which are coincident with the central axis 38 of the stud 20.

A tapered side surface 56 extends from the cylindrical outer side surface 52 in a direction away from the lower end portion 18 of the stud 20, that is, in an upward direction as viewed in FIGS. 2 and 3. The tapered side surface 56 is formed as the frustum of a right circular cone. The conical tapered side surface 56 of each of the retaining rings 44 has a central axis which is coincident with the central axis 38 of the stud 20. Therefore, the tapered side surfaces 56 are disposed in a coaxial relationship with the cylindrical outer side surfaces 52 of the retaining rings 44.

The tapered side surfaces 56 slope radially outward and downward (as viewed in FIGS. 2 and 3) toward the cylindrical outer side surfaces 52 of the retaining ring 44. This enables the tapered side surfaces 56 to deform the material of the cap 24 as the cap is pressed onto the upper end portion 26 of the stud 20. The tapered side surfaces 56 cold work or swage the material of the cap 24 as the cap is forced onto the stud 20.

In addition, each of the retaining rings 44 includes a flat annular end surface 60 (FIG. 3). The flat annular end surfaces 60 on the retaining rings 44 face downward toward the lower end portion 18 of the stud 20. The end surfaces 60 are disposed opposite from the tapered side surfaces 56 and face in a direction opposite to the direction in which the tapered side surfaces extend from the cylindrical side surface 52.

The flat annular end surfaces 60 have central axes which are coincident with the central axis 38 of the stud 20. The flat end surfaces 60 are disposed in planes which extend perpendicular to the central axis 38 of the stud 20. The end surfaces 60 intersect the cylindrical side surfaces 52 at circular corners 62 (FIG. 3).

When the cap 24 is forced onto the upper end portion 26 of the stud 20, the material forming the cap 24 resiliently moves into engagement with the corners 62 and end surfaces 60 on the upper end portion 26 of the stud 20 to hold the cap against being pulled off of the stud. The end surface 60, cylindrical outer side surface 52 and tapered side surface 56 of the each of the retaining rings 44 are disposed in a coaxial relationship with each other and with the longitudinal central axis 38 of the stud 20.

There is an interference fit between the cap 24 and the stud 20. Therefore, when the cap 24 is forced onto the upper end portion of the stud 20, a tapered side surface 56 of a retaining ring 44 cams or forces the material of the cap radially outward. As the cap continues to be pressed onto the stud 20, the material which was forced radially outward by the tapered side surface 56, slides along the cylindrical outer side surface 52 of the retaining ring. As the cap 24 continues to be pressed onto the upper end portion 26 of the stud 20, the material of the cap resiliently flows radially inward behind the end surface 60 on a retaining ring 44. Engagement of the material of the cap 24 with the end surfaces 60 on each of the retaining rings 44 holds the cap against being pulled upward (as viewed in FIG. 1) off of the stud 20.

The retaining rings 42 are mirror images of the retaining rings 44. Thus, each of the identical retaining rings 42 includes a cylindrical outer side surface 64 having the same diameter as the cylindrical outer side surface 52 of the retaining rings 44. The cylindrical outer side surfaces 64 of the retaining rings 42 are disposed in a coaxial relationship with the central axis 38 of the stud 20. The cylindrical outer side surfaces 64 have an axial extent which is the same as the axial extent of the cylindrical outer side surfaces 52 of the retaining rings 44.

The retaining rings 42 have tapered side surfaces 68 (FIG. 2) which correspond to the tapered side surfaces 56 on the retaining rings 44. However, the tapered side surfaces 68 on the retaining rings 42 face in the opposite direction from the tapered side surfaces 56 on the retaining rings 44. Thus, the tapered side surfaces 56 on the retaining rings 44 face upward (as viewed in FIG. 2) or away from the lower end portion 18 of the stud 20. The tapered side surfaces 68 on the retaining rings 42 face downward (as viewed in FIG. 2) or away from the upper end portion 26 of the stud 20. Each of the tapered side surfaces 68 on the retaining rings 42 is formed as the frustum of a right circular cone. Each of the tapered side surfaces 68 has a slope and axial extent which is the same as the slope and axial extent of the tapered side surfaces 56 on the retaining rings 44.

Each of the retaining rings 42 has a flat annular end surface 72 which is disposed on a side of a cylindrical surface 64 opposite from a tapered side surface 68. The flat annular end surfaces 72 on the retaining rings 42 are the same size as the flat annular end surfaces 60 on the retaining rings 44. The flat annular end surfaces 72 on the retaining rings 42 extend parallel to the flat annular end surfaces 60 on the retaining rings 44.

The flat annular end surfaces 72 on the retaining rings 42 have a central axis which is coincident with the central axis 38 of the stud 20. The flat annular end surfaces 72 on the retaining rings 42 face in an opposite direction from the flat annular end surfaces 60 on the retaining rings 44. Thus, the flat annular end surfaces 72 on the retaining rings 42 face toward the upper end portion 26 of the stud 20.

It is contemplated that the stud 20 may be formed of many different weldable metals. In one specific embodiment of the invention, the stud 20 was formed of mild steel. The retaining rings 42 and 44 were cold rolled on a cold rolled mild steel blank to form the specific embodiment of the stud.

The retaining rings 42 and 44 may be formed on the stud with many different dimensions. In the aforementioned specific embodiment of the stud 20, the retaining rings had cylindrical outer side surfaces 52 and 64 with a diameter of approximately 0.180 to 0.176 inches. The tapered side surfaces 56 and 68 on the retaining rings 42 and 44 had a slope of approximately 59° to 61° from a radial plane extending perpendicular to the longitudinal central axis 38 of the stud. Of course, the side surfaces 56 on the retaining rings 44 tapered in the opposite direction from the side surfaces 68 on the retaining rings 42.

In this specific embodiment of the invention, the distance between end surfaces 60 (FIG. 3) on adjacent retaining rings 44 and end surfaces 72 on adjacent retaining rings 42 (FIG. 2) was approximately 0.048 to 0.053 inches. In this specific embodiment of the stud 20, the cylindrical outer side surfaces 52 of the retaining rings 44 and the cylindrical outer side surfaces 64 of the retaining rings 42 had an axial extent of approximately 0.025 inches.

It is contemplated that the stud 20 will be formed with many different lengths. The specific embodiments of the stud previously described had three different overall lengths. Thus, three different studs 20 were formed with retaining rings 42 and 44 having the aforementioned dimensions and overall lengths of approximately 0.937 inches, 1.437 inches, and 1.937 inches. These lengths when used with known cap configurations and length reductions from the stud welding process would retain insulation panels with thicknesses of 1", 1½" or 2", respectively.

The cap 24 which is utilized with the stud 20 may be formed of many different materials. It is contemplated that the cap 24 may be formed of aluminum, mild steel or stainless steel (304). In the embodiment of the invention in which the stud 20 had retaining rings 42 and 44 with a diameter of 0.176 to 0.180 inches, the small diameter portion of the cavity 48 (FIG. 1) in the cap 24 was formed with an inside diameter of 0.172 to 0.174 inches. This particular cap was formed of aluminum.

It should be understood that the foregoing specific dimensions and materials for the stud 20 and cap 24 have been set forth herein merely for purposes of clarity of description and not for purposes of limitation of the invention. It is contemplated that the stud 20 and cap 24 will be formed of many different materials and have many different dimensions. The specific dimensions set forth herein are examples of the dimensions on specific embodiments of the stud 20 and cap 24. It is contemplated that other embodiments of the stud 20 and cap 24 will be formed with different dimensions and/or different materials.

Since the studs 20 have a cylindrical configuration when the studs are disposed in a magazine of a stud welding gun, the studs form a linear array 80 (FIG. 4). The studs 20 may be disposed in the linear array 80 with either end portion of the stud toward the right (as viewed in FIG. 4). This is because the opposite end portions of the studs 20 are mirror images of each other. Although the studs 20 have been illustrated in FIG. 4 in an array 80 associated with an automatic stud welding gun, the studs 20 can also be used with a stud welding gun which is manually loaded.

Figure 5:
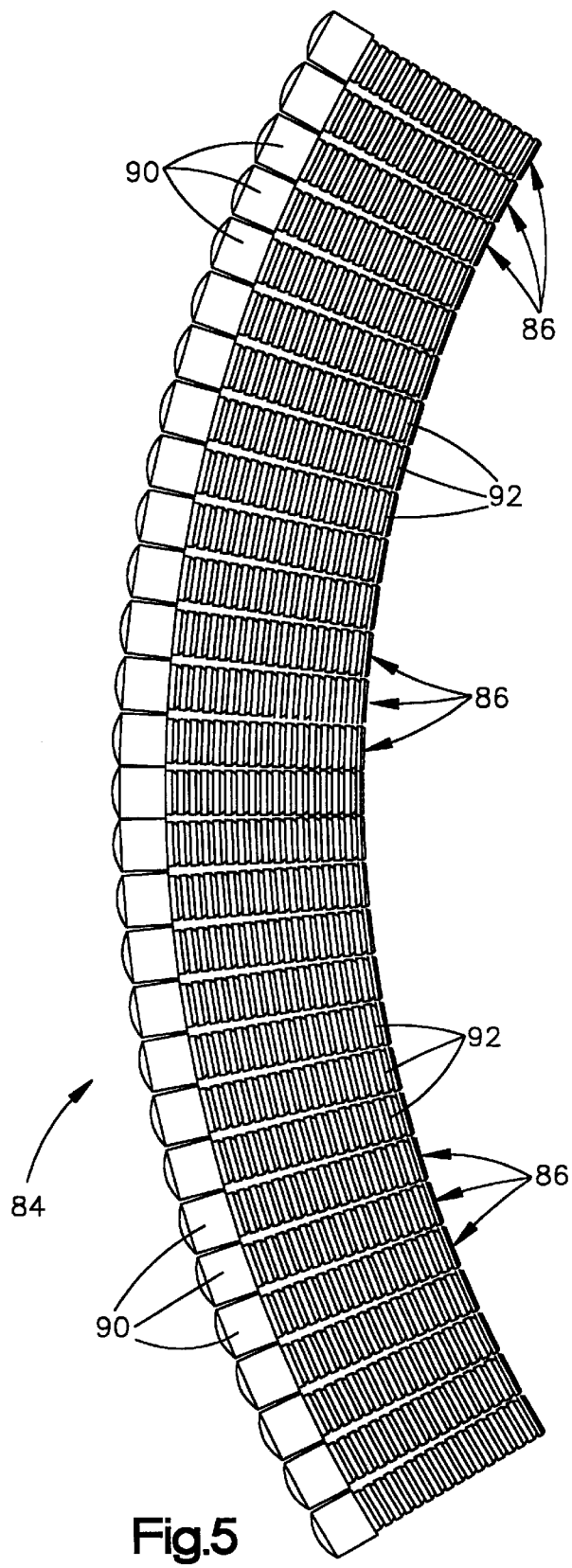
FIG. 5 illustrates an array of prior art studs as they would be disposed in a magazine of an automatic stud welding gun.

An array 84 of prior art studs 86 is illustrated in FIG. 5. The prior art studs 86 have relatively large diameter head end portions 90 and relatively small diameter weld end portions 92. This results in the array 84 of known studs curving downward and toward the right (as viewed in FIG. 5). The arc of curvature of the array 84 of known studs will vary as a function of the difference between the diameters of the head end portions 90 and the weld end portions 92.

From the above description of the invention, those skilled in the art will perceive improvements, changes and modifications. Such improvements, changes and modifications within the skill of the art are intended to be covered by the appended claims.

Having described the invention, the following is claimed:

1. A weld stud comprising:
    a generally cylindrical solid body,
    a first end portion and a second end portion opposite said first end portion,
    a first ringed section disposed on said first end portion,
    a second ringed section disposed on said second end portion,
    a cylindrical midportion disposed between said first and second ringed sections,
    said first ringed section including a plurality of spaced cylindrical portions having equal diameters, said spaced cylindrical portions including a first axial end and a second axial end, said first axial end facing away from said second end portion and said second axial end facing toward said second end portion,
    said first ringed section further including a plurality of frustoconical portions extending from and interconnecting said spaced cylindrical portions, said frustoconical portions tapering radially inward from said first axial end of said spaced cylindrical portions in a direction away from said second end portion,
    said second ringed section including a plurality of spaced cylindrical portions having equal diameters, said spaced cylindrical portions including a first axial end and a second axial end, said first axial end facing away from said first end portion and said second axial end facing toward said first end portion,
    said second ringed section further including a plurality of frustoconical portions extending from and interconnecting said spaced cylindrical portions, said frustoconical portions tapering radially inward from said spaced cylindrical portions in a direction away from said first end portion; and
    wherein said cylindrical portions have an axial length equal to or greater than the axial length of said frustoconical portions.

2. The weld stud of claim 1, wherein said plurality of cylindrical portions of said first and second ringed sections and said cylindrical midportion have an equal diameter, that diameter being the outer diameter of the stud.

3. The weld stud of claim 2, wherein said stud has a longitudinal central axis, and each cylindrical portion of said first and second ringed sections has a longitudinal central axis which is coincident with said longitudinal central axis of said stud.

4. The weld stud of claim 1, wherein said first and second end portions each include a distal end, said distal end presenting a flat solid end surface.

5. The weld stud of claim 1, wherein each said end surface includes an annular taper around the circumference of said end surface.

6. A weld stud having a solid generally cylindrical body portion including first and second opposed end portions and a midportion between said end portions, each of said first and second end portions having a generally flat solid end surface for welding said weld stud to a substrate and said first and second end portions being mirror images of each other such that said weld stud may be transported through a cylindrical passage with either of said end surfaces of said first and second end portions facing said substrate prior to welding, each of said first and second end portions including a plurality of cylindrical ring portions spaced by frustoconical portions, with said frustoconical portions of said first end portion tapered inwardly toward said end surface of said first end portion and said frustoconical portions of said second end portion tapered inwardly toward said end surface of said second end portion, wherein said cylindrical portions have an axial length equal to or greater than the axial length of said frustoconical portions.

7. The weld stud of claim 6, wherein said plurality of cylindrical portions of said first and second ringed sections and said cylindrical midportion have an equal diameter, that diameter being the outer diameter of the stud.

8. The weld stud of claim 7, wherein said stud has a longitudinal central axis, and each cylindrical portion of said first and second ringed sections has a longitudinal central axis which is coincident with said longitudinal central axis of said stud.

9. The weld stud of claim 6, wherein each said end surface includes an annular taper around the circumference of said end surface.

10. The weld stud of claim 6, wherein said midportion has a cylindrical shape.

* * * * *